US011322881B2

(12) United States Patent
Eschenbeck et al.

(10) Patent No.: US 11,322,881 B2
(45) Date of Patent: May 3, 2022

(54) CONNECTION DEVICE

(71) Applicant: ZF Friedrichshafen AG, Friedrichshafen (DE)

(72) Inventors: Linus Eschenbeck, Wangen (DE); Christopher Allnoch, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/609,101

(22) PCT Filed: Mar. 28, 2018

(86) PCT No.: PCT/EP2018/057981
§ 371 (c)(1),
(2) Date: Oct. 28, 2019

(87) PCT Pub. No.: WO2018/197145
PCT Pub. Date: Nov. 1, 2018

(65) Prior Publication Data
US 2020/0091651 A1   Mar. 19, 2020

(30) Foreign Application Priority Data

Apr. 28, 2017   (DE) .......................... 102017207215.6

(51) Int. Cl.
*H01R 13/52*     (2006.01)
*B60R 16/02*     (2006.01)
(Continued)

(52) U.S. Cl.
CPC ....... *H01R 13/521* (2013.01); *B60R 16/0215* (2013.01); *H01R 4/34* (2013.01);
(Continued)

(58) Field of Classification Search
CPC .......... H01R 4/34; H01R 9/16; H01R 13/521; H01R 13/74; H01R 2201/26;
(Continued)

(56) References Cited

U.S. PATENT DOCUMENTS

| 5,417,587 A  * | 5/1995 | Katsuda ................... | H01R 4/64 |
| | | | 439/559 |
| 6,790,050 B1 * | 9/2004 | Roth-Stielow ........... | H02B 1/48 |
| | | | 361/752 |

(Continued)

FOREIGN PATENT DOCUMENTS

| DE | 101 34 053 A1 | 2/2003 |
| DE | 10 2008 040 493 A1 | 1/2010 |

(Continued)

OTHER PUBLICATIONS

International Search Report and Written Opinion of the International Search Authority dated May 22, 2018 in International Application No. PCT/EP2018/057981 (English and German languages) (14 pp.).

(Continued)

*Primary Examiner* — Travis S Chambers
(74) *Attorney, Agent, or Firm* — Crowell & Moring LLP

(57) ABSTRACT

A connection device may include a releasable electrical connection between a first current conducting element of a power electronics system and a second current conducting element of a transmission. The connection device may be configured such that it is removably locatable in a first opening in at least one of a power electronics housing and a second opening in a transmission housing. A transmission for a motor vehicle may include the connection device.

18 Claims, 4 Drawing Sheets

(51) Int. Cl.
*H01R 4/34* (2006.01)
*H01R 9/16* (2006.01)
*H01R 13/74* (2006.01)
*H01R 13/621* (2006.01)
*B60R 16/023* (2006.01)

(52) U.S. Cl.
CPC .......... *H01R 9/16* (2013.01); *H01R 13/6215* (2013.01); *H01R 13/74* (2013.01); *B60R 16/0231* (2013.01); *H01R 2201/26* (2013.01)

(58) Field of Classification Search
CPC .............. H01R 13/5202; H01R 13/621; H01R 13/6215; B60R 16/0215; B60R 16/0231
USPC ................ 439/587, 271, 364, 365, 588, 310
See application file for complete search history.

(56) References Cited

U.S. PATENT DOCUMENTS

| | | | | |
|---|---|---|---|---|
| 7,306,475 B2* | 12/2007 | Tsuruta | .................... | H01R 4/30 439/364 |
| 7,372,701 B2* | 5/2008 | Jacobson | ............... | H05K 7/026 361/714 |
| 8,317,544 B2* | 11/2012 | Matsuoka | ............ | H01R 13/512 439/607.55 |
| 9,017,099 B2* | 4/2015 | Ikeda | .................... | H01R 13/521 439/559 |
| 9,071,005 B2* | 6/2015 | Ikezawa | ................ | H01R 13/405 |
| 9,228,605 B2* | 1/2016 | Takemura | ................ | H01R 9/18 |
| 9,698,528 B2* | 7/2017 | Nishida | .............. | H01R 13/6315 |
| 2009/0124121 A1* | 5/2009 | Matsuoka | .......... | H01R 13/5202 439/550 |
| 2010/0253164 A1* | 10/2010 | Chamberlin | ........... | H02K 5/225 310/71 |
| 2012/0319513 A1* | 12/2012 | Okamoto | ............... | H02K 5/225 310/71 |
| 2014/0322973 A1* | 10/2014 | Okamoto | ........... | H01R 13/4223 439/587 |

FOREIGN PATENT DOCUMENTS

| | | |
|---|---|---|
| DE | 20 2012 011 808 U1 | 4/2014 |
| DE | 10 2015 213 439 A1 | 1/2017 |
| EP | 2 544 340 A1 | 1/2013 |
| WO | WO 2015/078459 A2 | 6/2015 |

OTHER PUBLICATIONS

Office Action dated Jan. 17, 2018 for German Patent Application No. 10 2017 207 215.6, (12 pp.), note: pp. 1 and 2 are English language Explanations to Section C. Result of Determination Document.

* cited by examiner

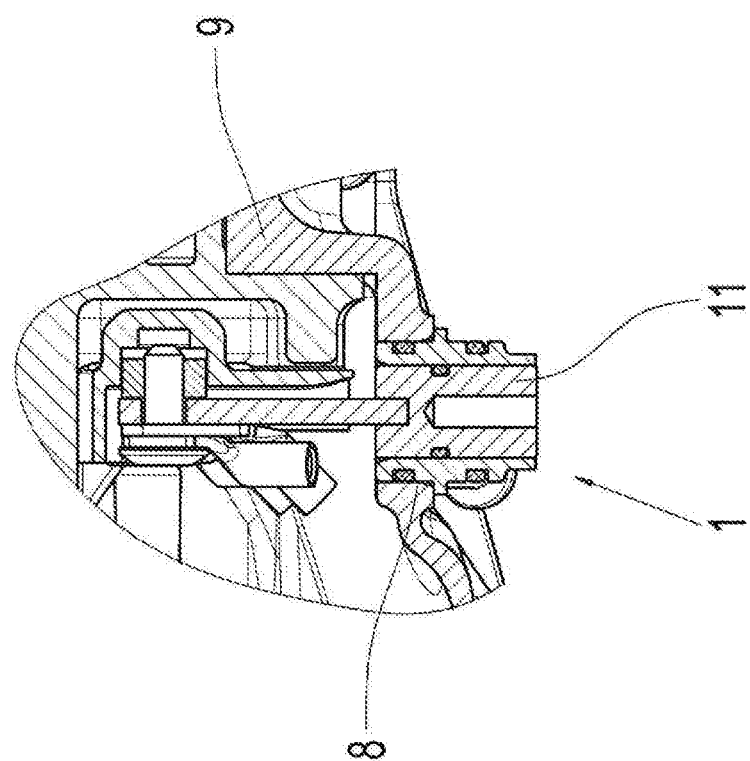
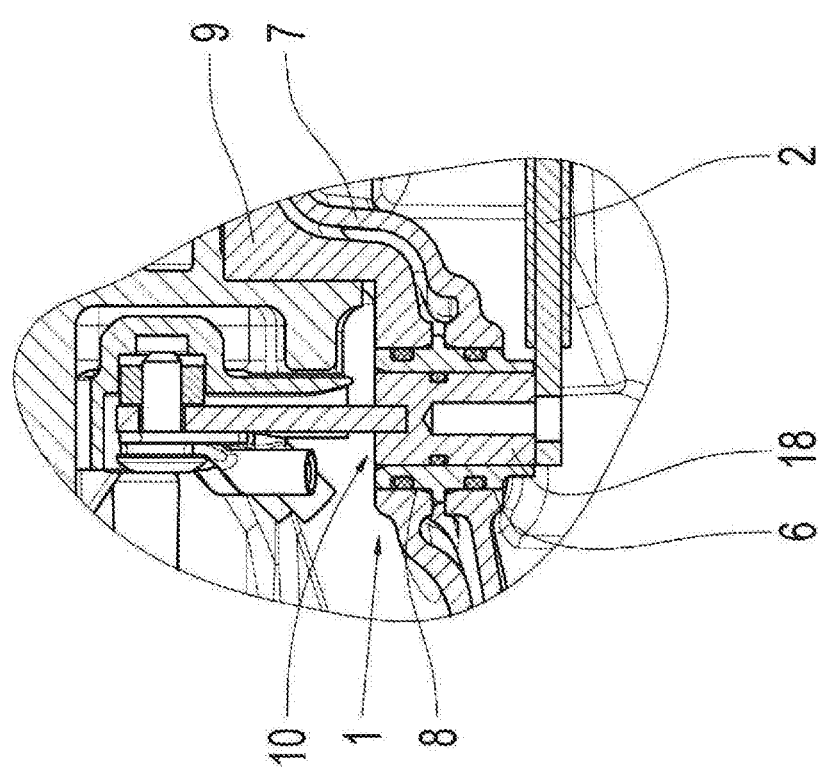

CONNECTION DEVICE

RELATED APPLICATIONS

This application is a filing under 35 U.S.C. § 371 of International Patent Application PCT/EP2018/057981, filed Mar. 28, 2018, and claiming priority to German Patent Application 10 2017 207 215.6, filed Apr. 28, 2017. All applications listed in this paragraph are hereby incorporated by reference in their entireties.

TECHNICAL FIELD

The invention relates to a connection device for producing an electrical connection between a current conducting element of a power electronics system and another current conducting element of a transmission.

BACKGROUND

The invention also relates to a power electronics system that has the connection device. Moreover, the invention relates to a transmission that has the connection device or the power electronics system. The invention also relates to a motor vehicle that has such a transmission or the power electronics system. Numerous power electronics systems are known from the prior art, which are used to control or regulate an electric machine in the transmission. An embodiment is known from WO 2015 078 459 A1 in which a current conducting element dedicated to the power electronics is brought into direct contact with another current conducting element dedicated to the transmission, in particular the electric machine in the transmission, in order to obtain an electric connection between the power electronics and the transmission. The current conducting element dedicated to the power electronics and the other current conducting element dedicated to the transmission are connected to one another by means of a screw. A power electronics housing has an aperture through which the screw can be inserted in the power electronics, thus obtaining the screw connection. The power electronics housing has an outlet that can accommodate a sealing element in the transmission, and from which the current conducting element extends.

The disadvantage with the known embodiment is that the manufacturer of the power electronics system cannot provide the transmission manufacturer with a power electronics system in which the seal has been tested for impermeability. The impermeability test must take place after the mechanical connection of the power electronics to the transmission. An impermeability testing of the power electronics after installation is time consuming and expensive.

The object of the invention is therefore to create a power electronics system in which an impermeability test does not need to be conducted after the installation of the transmission.

BRIEF DESCRIPTION OF THE DRAWINGS

The subject matter of the invention is schematically illustrated in the drawings and shall be explained below in reference to the drawings, wherein identical elements, or elements functioning in a similar manner, are usually provided with the same reference symbols. Therein:

FIG. 5 shows a schematic illustration of the connection device according to the invention, which is connected electrically and mechanically to the transmission and only connected electrically to the power electronics system;

FIG. 6 shows a schematic illustration of the connection device according to the invention, which is only connected electrically and mechanically to the transmission;

DETAILED DESCRIPTION

Figure 2:
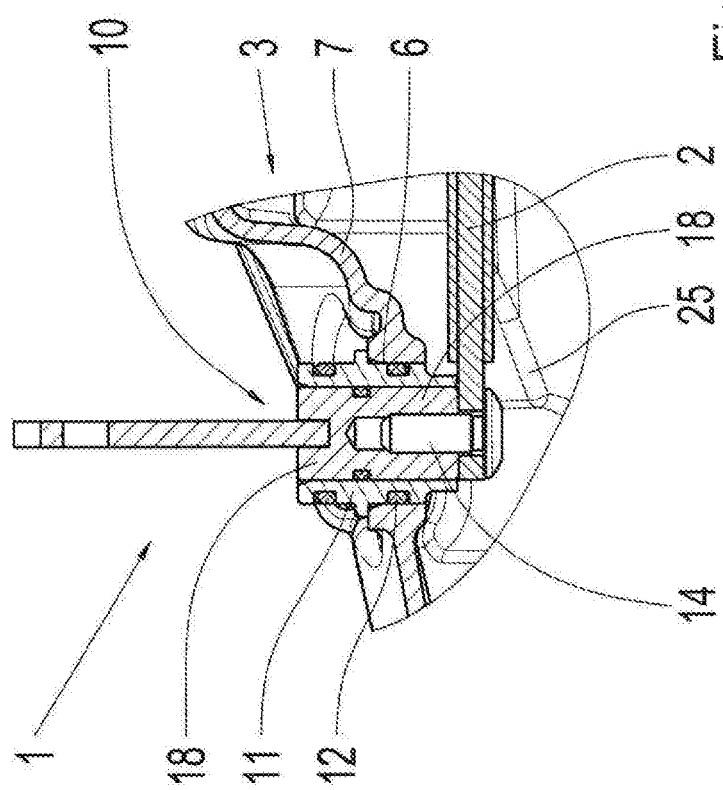
FIG. 2 shows a schematic illustration of the connection device according to the invention, which is only connected electrically and mechanically to the power electronics system.

The object of the invention is achieved with a connection device of the type specified in the introduction, which is characterized in that the connection device can be electrically connected to the first current conducting element and the second current conducting element in a releasable manner, and is designed such that it can be removably placed in an opening in a power electronics housing and/or in an opening in a transmission housing.

The connection device according to the invention has the advantage that the manufacturer of the power electronics system can deliver a power electronics system to the transmission manufacturer that has already been tested for impermeability. This is possible due to the design of the connection device. The connection device is designed such that when it is placed in the opening in the power electronics housing, it seals the opening, such that no liquids from outside the power electronics can flow into the power electronics, or vice versa. Moreover, the power electronics system is designed such that when it is placed in the other opening in the transmission housing it seals the other opening, such that no liquids, in particular transmission fluid, can escape or enter the interior of the transmission. Because an impermeability test can already be carried out on the power electronics system by the manufacturer, there is no need for an impermeability test by the transmission manufacturer after installing the transmission, thus reducing the time and costs for manufacturing the transmission.

A further advantage of the connection device according to the invention is that a simple electrical connection can be obtained between the power electronics and the transmission by means of the connection device. In particular, it is possible to place the power electronics system on the transmission housing with the connection device. Accordingly, it is no longer necessary for the power electronics system to be placed in a region of the motor vehicle at a distance to the transmission. It is therefore no longer necessary to electrically connect the power electronics system to the transmission by means of at least one electrical cable, as was the case with the known embodiments.

There is also the advantage with the connection device according to the invention that if there is a defect in the power electronics system, it can be easily replaced. It is easy to replace the power electronics system because the connection device remains in the opening in the transmission when the power electronics system is removed. It is therefore not necessary to disconnect the connection device from the current conducting element in the transmission, which may be very time consuming due to the difficulty in accessing the connection point between the connection device and this current conducting element. In particular, if the power electronics system is defective, it is no longer necessary to remove the transmission from the motor vehicle. Moreover, the rotor in the electric machine does not need to be removed in order to access the connection point. As a result, the removal of the power electronics system from the transmission is simplified for servicing.

As set forth in the invention, a releasable connection is understood to be a connection that can be disconnected without damaging the components. The disconnection of the electrical connection can be achieved with or without tools. As such, the electrical connection between the connection device and the current conducting element of the power electronics system can be disconnected without damaging the connection device or the current conducting element. This is the same for the releasable electrical connection between the connection device and the other current conducting element in the transmission.

As set forth in the invention, a power electronics system comprises a group of different components, by means of which current to the electric machine, which can be placed in the transmission, in particular in a hollow chamber in the transmission, can be controlled or regulated. In order to control or regulate the current conducted to the electric machine, the power electronics system can contain one or more circuit breakers, e.g. power transistors.

As a result of the connection device, the current conducting element of the power electronics and the current conducting element of the transmission are not directly connected electrically to one another. In particular, the first current conducting element and the second current conducting element are indirectly connected electrically to one another by means of the connecting current conducting element.

In a special embodiment, the connection device can have a connecting current conducting element and a sleeve that encompasses a section of the connecting current conducting element. The sleeve can prevent the connecting current conducting element from coming in contact with the transmission housing and/or the power electronics housing. As a result, a connection device is obtained that has a simple construction, in which the sleeve of the connecting current conducting element is at least partially electrically insulated. The connecting current conducting element can be designed such that it extends in part away from the transmission housing toward the second current conducting element, and another part extends away from the power electronics housing toward the first current conducting element. Furthermore, another part of the connecting current conducting element is placed in the opening in the power electronics housing and/or the other opening in the transmission housing.

It is particularly advantageous when the sleeve has a seal that can seal a region between the sleeve and the power electronics housing. Furthermore, the sleeve can have a second seal that seals the region between the sleeve and the transmission housing. It can thus be readily ensured that when the connection device is placed in the opening in the power electronics housing, the opening is sealed by the connection device. Furthermore, it can be ensured that when the connection device is placed in the opening in the transmission housing, this opening is sealed by the connection device.

The connecting current conducting element can be releasably connected, electrically and/or mechanically, at one end to the current conducting element, and can be releasably connected, electrically and/or mechanically, at the other end to the other current conducting element. As a result, a connection device is obtained, by means of which an electrical connection can easily be established between the current conducting element of the power electronics system and the current conducting element of the transmission. Moreover, a connection device is obtained that can be easily connected mechanically to the current conducting element of the power electronics system and the current conducting element of the transmission.

A power electronics system that has the connection device is of particular advantage. The connection device, in particular a part of the sleeve, can be placed in the opening. As a result, a sealed power electronics system is obtained in a simple manner.

In a special embodiment of the power electronics system, the current conducting element can be mechanically connected to the connection device by means of a form fitting and/or force fitting connection. In particular, the current conducting element can be mechanically connected to the connection device, in particular the connecting current conducting element, by means of a screw. The other current conducting element and the connection device can be connected to one another such that an electrical connection is first obtained between the current conducting element and the connecting current conducting element when both components are mechanically connected to one another. The electrical connection between the current conducting element and the connecting current conducting element can be obtained in that the connecting current conducting element and the other current conducting element are in direct contact with one another.

The connection device can be placed in the power electronics housing such that a part of the sleeve that comprises the seal is located in the opening. As a result, this part of the sleeve contributes to the sealing of the power electronics system. Another part of the sleeve extends out of the power electronics housing.

A connection device can be designed and placed such that an electrical connection is obtained between the connecting current conducting element and the current conducting element in a hollow chamber bordered by the power electronics housing. In addition, the connection device can be designed such that the electrical connection between the connection device, in particular the connecting current conducting element and the current conducting element of the transmission is obtained in a hollow chamber in the transmission encompassed by the transmission housing.

The power electronics housing can have at least one further opening that can be closed with a lid. It can be ensured with the second opening that it is possible to access the connection point between the connecting current conducting element and the current conducting element, such that the electrical connection can be established or disengaged in a simple manner.

A transmission that has the connection device or the power electronics system is of particular advantage. The connection device, in particular the sleeve, is placed in the opening in the power electronics housing and in the opening in the transmission housing, or just in the opening in the transmission housing.

In particular, a part of the connection device can be placed in the opening in the power electronics housing and in the opening in the transmission housing when the power electronics functions correctly and is placed in a receiver in the transmission housing. In contrast, a part of the connection device can be placed in just the opening in transmission housing when the power electronics is defective and removed from the transmission housing.

The other current conducting element and the connection device, in particular the connecting current conducting element, can be connected to one another by means of a form fitting and/or force fitting connection. In particular, the other current conducting element and the connection device can be mechanically connected by means of a screw. The other current conducting element and the connection device can be connected to one another such that an electrical connection is first established between the other current conducting element and the connecting current conducting element when both components are mechanically connected to one another. The electrical connection between the connecting current conducting element and the other current conducting element can then be obtained such that the connecting current conducting element and the other current conducting element are in direct contact with one another.

When the connection device is placed in the other opening, another part of the sleeve that has the other seal can be placed in the other opening. The other part of the sleeve extends away from the transmission housing when the power electronics system is not installed on the transmission housing.

A motor vehicle that has the power electronics system or such a transmission is of particular advantage.

Figure 1:
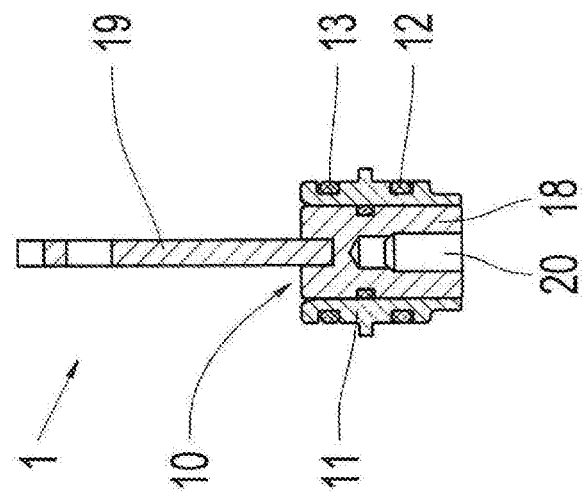
FIG. 1 shows a schematic illustration of the connection device according to the invention.
Figure 4:
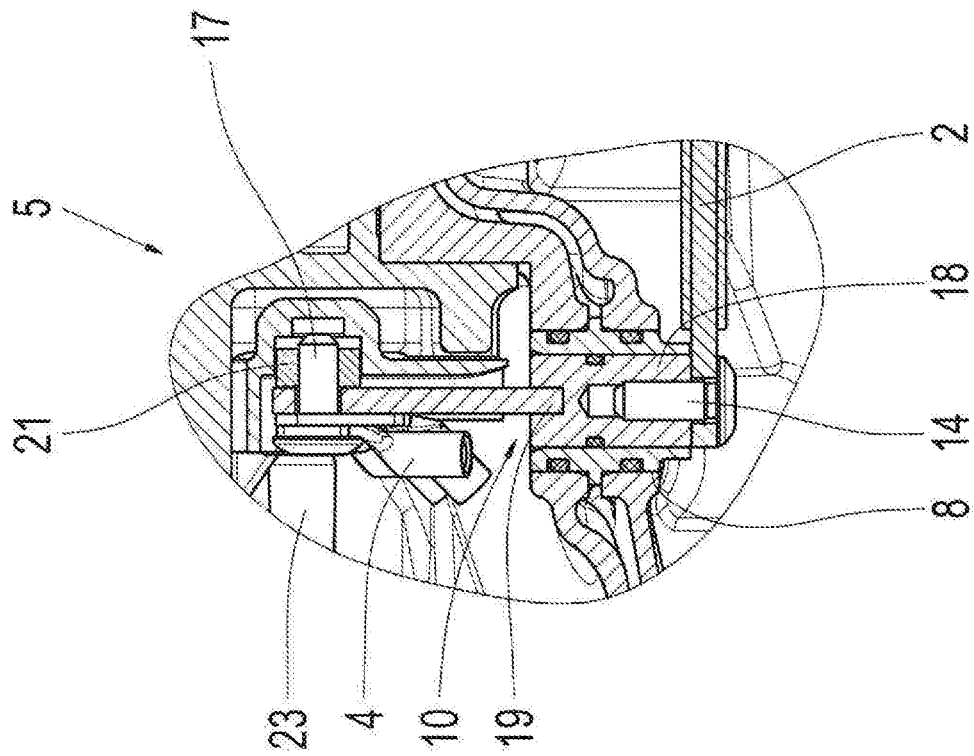
FIG. 4 shows a schematic illustration of the connection device according to the invention, which is connected electrically and mechanically to the power electronics system and the transmission.

FIG. 1 shows a schematic illustration of the connection device 1, which produces an electrical connection between the a current conducting element 2 of a power electronics 3 shown in FIG. 2, and another current conducting element 4 of a transmission 5 shown in FIG. 4. The connection device 1 is designed such that it can be releasably connected at one end to the current conducting element 2 and the power electronics system 3. In addition, the connection device 1 is designed such that it can be releasably connected at another end to the other current conducting element 4 of the transmission 5.

The connection device 1 is designed such that it can be placed in an opening 6 in a power electronics housing 7, as can be seen in FIG. 2. The connection device 1 is also designed such that it can be placed in another opening 8 in the transmission housing 9, as can be seen in FIG. 6. Moreover, the connection device 1 is designed such that it is placed in the opening 6 in the power electronics housing 7 and the other opening 8 in the transmission housing 9, as can be seen in FIG. 4.

The connection device 1 has a connecting current conducting element 10. The connecting current conducting element 10 has a first section 18 and a second section 19, which is electrically connected to the first section 18. The first section 18 of the connecting current conducting element 10 has a bore hole 20, in which a screw, not shown in FIG. 1, can be inserted. In addition, the connection device 1 has a sleeve 11, which encompasses the first section 18 of the connecting current conducting element 10.

The sleeve has a first seal 12 and a second seal 13, which are spaced apart from one another along the axial direction of the sleeve. The first section 18 of the connecting current conducting element 10 and the second section 19 of the connecting current conducting element 10 have different cross sections. As such, the second section 19 of the connecting current conducting element 10 is substantially plate-shaped.

FIG. 2 shows a schematic illustration of the connection device 1 that is electrically and mechanically connected to the power electronics system 3. The connection device 1 does not differ in terms of its structure from the embodiment shown in FIG. 1.

The connection device 1 is placed in the opening 6 in the power electronics housing 7. In particular, a part of the sleeve 11 comprising the seal 12 is located in the opening 6 and in contact with the power electronics housing 7. The rest of the sleeve 11 protrudes from the power electronics housing in a direction extending away from the power electronics 3.

The connection device 10, in particular the first section 18 of the connecting current conducting element 10, touches the current conducting element 2 of the power electronics 3, such that an electrical connection is obtained between the connecting current conducting element 10 and that current conducting element 2. The current conducting element 2 is electrically connected to other loads, not shown in the drawings. The current conducting element 2 and the first section 18 are mechanically releasably connected to one another by means of a screw 14. The screw 14 is located in the bore hole 20 in the first connecting element 18. The connection device 1 is mechanically and electrically connected to the current conducting element 2 inside a hollow chamber 25 delimited by the power electronics housing 7.

Figure 3:
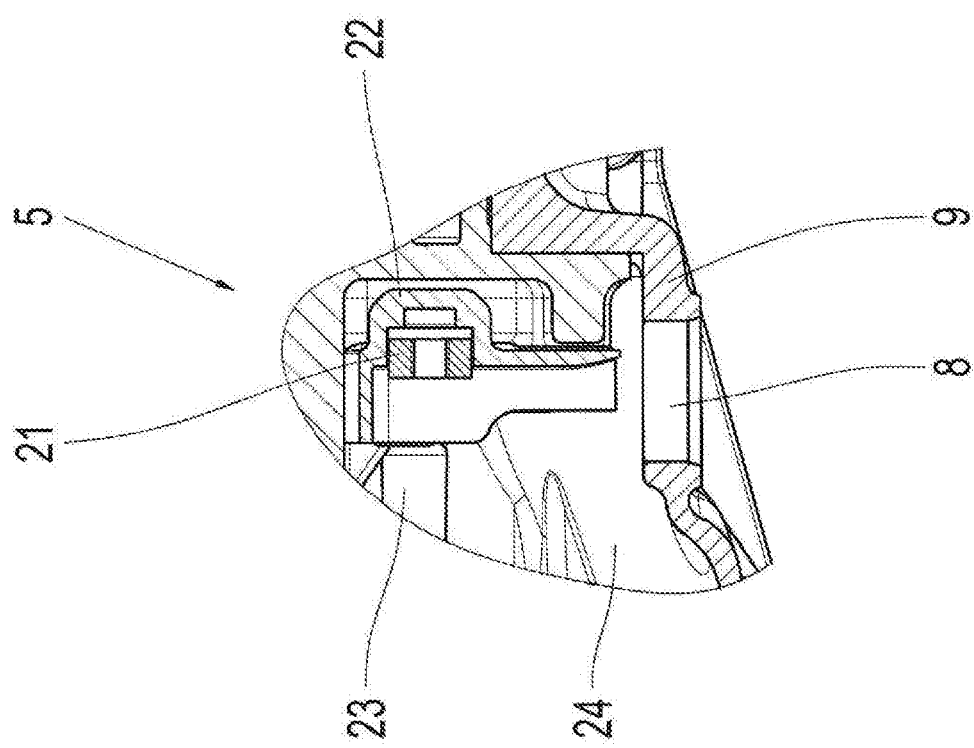
FIG. 3 shows a schematic illustration of a part of a transmission in which the connection device can be inserted.

FIG. 3 shows a schematic illustration of a part of the transmission 5 in which the connection device 1 can be inserted. The transmission 5 has a transmission housing 9 that has a further opening 8. The transmission housing 9 encompasses a further hollow chamber 24 in which an insulating plate 22 is located. The insulating plate 22 prevents the other current conducting element and/or the connecting current conducting element from coming in contact with the transmission housing 9. The insulating plate 22 encompasses a nut 21 that accommodates a second screw 15, not shown in FIG. 3. The electrical and mechanical connection between the connection device 1 and the current conducting element 4 shown in FIG. 4 takes place in the other hollow chamber 24.

FIG. 4 shows a schematic illustration of the connection device according to the invention, which is electrically and mechanically connected to the power electronics 3 and the transmission 5. The first section 18 of the connecting current conducting element 10 is mechanically connected to the current conducting element 2 by means of the screw 14. Moreover, the second section 19 of the connecting current conducting element 10 is mechanically connected to the other current conducting element 4 by means of another screw 17. The other current conducting element 4 is electrically connected to a stator 23 in an electric machine. The other current conducting element 4 and the second section 19 are electrically connected to one another, in particular coming in contact with one another, when the other screw 17 is screwed into the nut 21.

In the embodiment shown in FIG. 5, the current conducting element 2 of the power electronics 3 is no longer mechanically connected to the first section 18 of the connecting current conducting element 10 by means of the screw 14. The connecting current conducting element 10 touches the current conducting element 2, however, such that an electrical connection is established. Because there is no longer an electrical connection between the connection device and the current conducting element 2, it is possible to move the power electronics system 3 in relation to the connection device 1, such that the connection device 1 is no longer located in the opening 6, as shown in FIG. 6.

FIG. 6 shows a schematic illustration of the connection device 1 according to the invention, which is only connected electrically and mechanically to the transmission 5. In particular, it can be seen in FIG. 6 that the sleeve 11 is only located in the opening 8 in the transmission housing 9. The power electronics 3 has been removed from the transmission housing 9.

Figure 7:
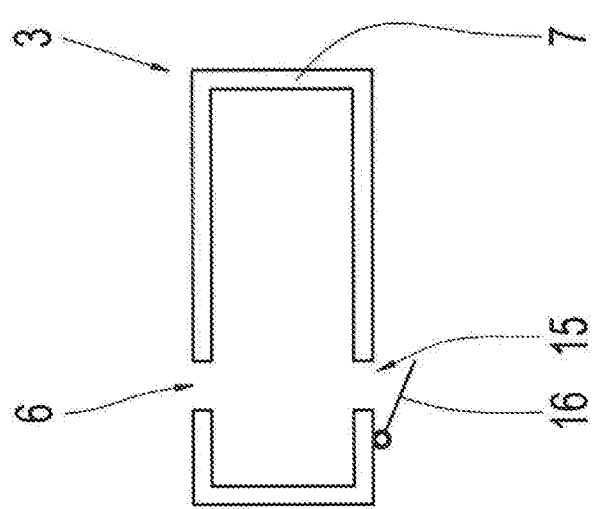
FIG. 7 shows a schematic illustration of the power electronics housing.

FIG. 7 shows a schematic illustration of the power electronics housing 7. The power electronics housing 7 has another opening 15, which can be closed by a lid 16. The other opening 15 is placed such that a mechanical connection of the connection device 1 to the current conducting element 2 (not shown) can be established via the opening 15. Further components of the power electronics system 3 are not shown in FIG. 7.

REFERENCE SYMBOLS 1 connection device
2 current conducting element
3 power electronics system
4 second current conducting element
5 transmission
6 opening
7 power electronics housing
8 second opening
9 transmission housing
10 connecting current conducting element
11 sleeve
12 seal
13 second seal
14 screw
15 further opening
16 lid
17 second screw
18 first section of the connecting current conducting element
19 second section of the connecting current conducting element
20 bore hole
21 nut
22 insulating plate
23 stator
24 second hollow chamber
25 hollow chamber

The invention claimed is:

1. A connection device for establishing an electrical connection between a first current conducting element of a power electronics system and a second current conducting element of a transmission, the connection device comprising:
a first section on a first end of the connection device and a second section on a second end of the connection device,
wherein the first section of the connection device is configured to releasably electrically connect to the first current conducting element and the second section of the connection device is configured to releasably electrically connect to the second current conducting element, and
wherein the connection device is configured such, in an operational state that the first section is removably located within a first opening in a power electronics housing of the power electronics system and the second section is removably located within a second opening in a transmission housing of the transmission, and
wherein the first section includes a bore hole extending towards the second section for receiving a fastener, wherein the connection device is placed in the first opening.

2. The connection device according to claim 1, wherein the bore hole extends into a central opening of a sleeve, the sleeve circumnavigating the first section of the connection device.

3. The power electronics system according to claim 1, wherein the first current conducting element is connected to the connection device with a screw.

4. The power electronics system according to claim 1, wherein a portion of a sleeve comprising a seal is placed in the first opening in the power electronics housing.

5. The power electronics system according to claim 1, wherein the power electronics housing has a third opening that can be closed with a lid.

6. A motor vehicle that has a power electronics system according to claim 1.

7. A transmission that has the power electronics system according to claim 1.

8. The connection device according to claim 1, wherein the connection device has a connecting current conducting element and a sleeve, and wherein the sleeve encompasses a section of the connecting current conducting element, and wherein the sleeve encompasses at least a portion of the bore hole.

9. The connection device according to claim 8, wherein the sleeve has a seal that seals a region between the sleeve and the power electronics housing.

10. The connection device according to claim 8, wherein the connection device has a second seal that seals a region between the sleeve and the transmission housing.

11. A transmission that has the connection device according to claim 1.

12. The transmission according to claim 11, wherein the second current conducting element is connected to the connection device with a screw.

13. The transmission according to claim 11, wherein a portion of a sleeve comprising a seal is placed in the second opening in the transmission housing.

14. A motor vehicle that has the transmission according to claim 11.

15. A connection device, comprising:
a releasable electrical connection between a first current conducting element of a power electronics system and a second current conducting element of a transmission,
wherein the connection device is configured such that it is removably locatable in a first opening in at least one of a power electronics housing and a second opening in a transmission housing; and
a bore hole extending away from at least one opening, the bore hole being configured to receive a fastener,
wherein the connection device has a connecting current conducting element and a sleeve, and wherein the sleeve encompasses a section of the connecting current conducting element, and wherein the sleeve at least partially encompasses the bore hole, and
wherein the sleeve has a seal that seals a region between the sleeve and the power electronics housing.

16. The connection device according to claim 15, wherein the connection device is electrically releasably connected at a first end to the first current conducting element and electrically releasably connected at a second end to the second current conducting element.

17. A power electronics system that has the connection device according to claim 15, wherein the connection device is placed in the first opening.

18. A connection device for establishing an electrical connection between a first current conducting element of a power electronics system and a second current conducting element of a transmission, the connection device comprising:
- a first section on a first end of the connection device and a second section on a second end of the connection device,
- wherein the first section of the connection device is configured to releasably electrically connect to the first current conducting element and the second section of the connection device is configured to releasably electrically connect to the second current conducting element, and
- wherein the connection device is configured such, in an operational state that the first section is removably located within a first opening in a power electronics housing of the power electronics system and the second section is removably located within a second opening in a transmission housing of the transmission, and
- wherein the first section includes a bore hole extending towards the second section for receiving a fastener,
- wherein the connection device has a connecting current conducting element and a sleeve, and wherein the sleeve encompasses a section of the connecting current conducting element, and wherein the sleeve encompasses at least a portion of the bore hole, and
- wherein the sleeve has a seal that seals a region between the sleeve and the power electronics housing.

* * * * *